UNITED STATES PATENT OFFICE.

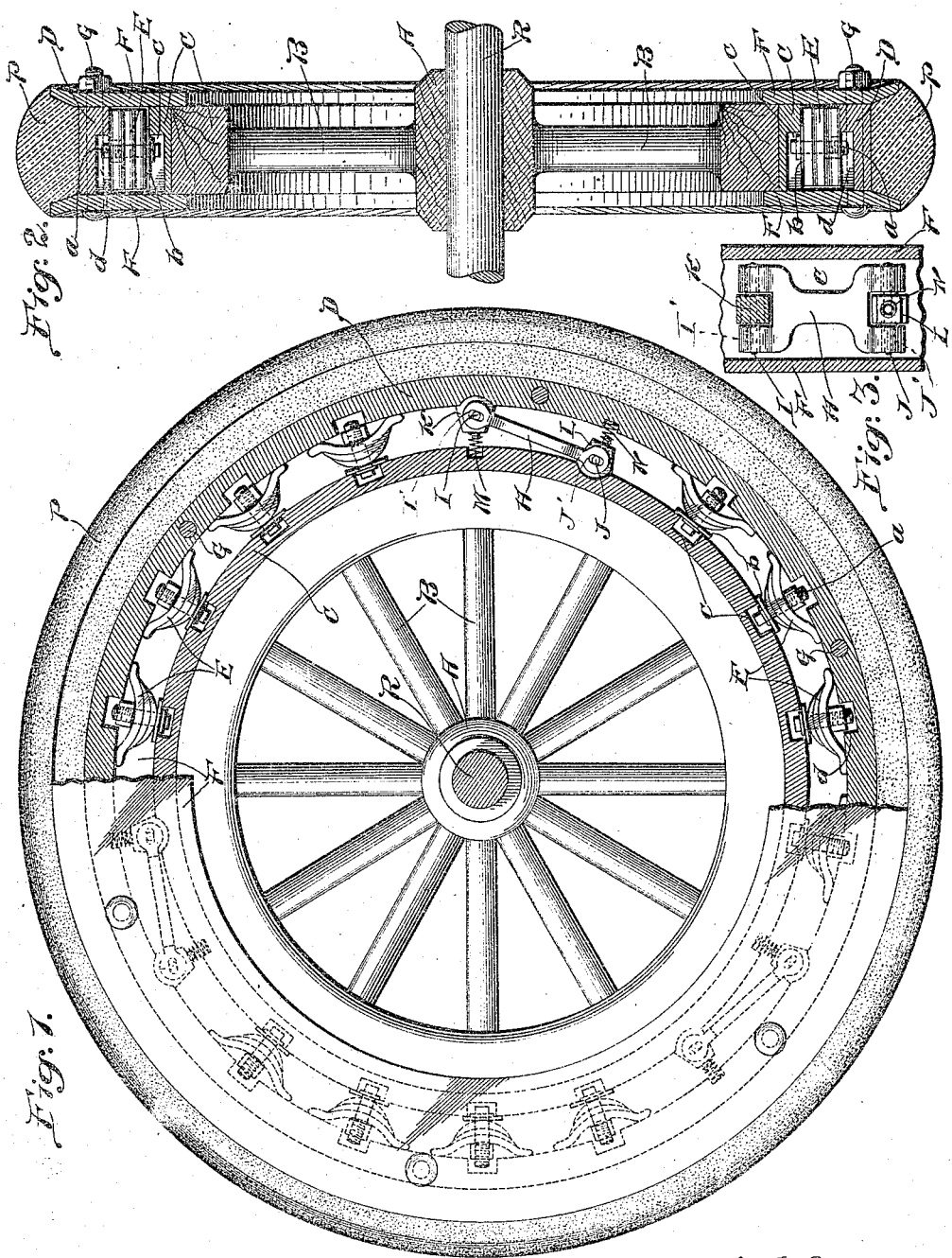

BYRON L. DEWEY, OF DETROIT, MICHIGAN.

RESILIENT WHEEL.

1,306,176.                    Specification of Letters Patent.        Patented June 10, 1919.

Application filed May 18, 1918. Serial No. 235,374.

*To all whom it may concern:*

Be it known that I, BYRON L. DEWEY, a citizen of the United States, residing at Detroit, in the county of Wayne and State of Michigan, have invented a new and useful Improvement in Resilient Wheels, of which the following is a full, clear, and exact specification, reference being had to the accompanying drawings, which form a part thereof.

My invention relates to resilient wheels for vehicles, and particularly to resilient wheels for self-driven vehicles, such as auto trucks and automobiles.

The object of my invention is to provide a strong and durable wheel that will be resilient so that it can be used on vehicles driven at a rather high rate of speed; and a further object of my invention is to provide a durable resilient wheel that may be used either as the driving wheel on a vehicle or as the driven wheel.

My improved wheel is fully shown in the accompanying drawings, which form a part of this specification, where Figure 1 is a side view of a wheel, embodying my invention, having certain portions cut away to show the internal construction of some of the parts; Fig. 2 is a diametral section of one of my wheels mounted on an axle; Fig. 3 is a view showing details of construction.

Referring to the drawings, A is the hub of a wheel adapted to be mounted on an axle R so as to either turn with the axle or to turn on the axle. The hub A is connected by means of suitable spokes B to an inner rim C. D is an outer rim spaced away from the inner rim C and kept spaced therefrom by a plurality of springs E. F are side-rings fastened to the outer rim D by means of suitable bolts G. The inner and outer rims are connected by a plurality of links H, which are pivotally connected by the bolts I and J to the lugs K and L formed on the outer and inner rims, respectively. The links H are provided with elongated openings I' and J' in which the bolts I and J, respectively, play. M is a small, strong spring interposed between the lug K and the inner rim C; and N is a similar small, strong spring interposed between the lug L and the outer rim. These springs M and N are supposed to be strong and stiff and to take the place, as far as possible, of springs E which would otherwise occupy the space between the rims which is occupied by the links H. The links H are preferably disposed so that they will lie, when the inner and outer rims are concentric with one another, in a position which is nearly tangent to the outer surface of the inner rim. In the specific embodiment of my invention shown in the accompanying drawings the springs E are shown as leaf springs with three leaves to each, although this is not absolutely necessary. The leaves of the spring are held together by a suitable bolt $a$ which is provided at its head end with a suitable washer-plate $b$. Suitable grooves $c$ and $d$ are provided in the inner and outer rims, respectively, to receive the ends of the bolt $a$. The leaf springs are, preferably, substantially as wide as the space between the inside surfaces of the side-plates F as shown in Fig. 2. The springs E are, preferably, put in place under tension so that when the vehicle is not subjected to a load and the inner and outer rims are concentric the springs E are in a stressed condition. The amount of stress imposed upon the springs when in this condition will be determined largely by the load the wheel is to carry and by the resilience required of it.

When the wheel is used as a driving wheel, the hub A is made to turn by means of the axle R and motion is transmitted from the inner rim to the outer rim by means of the links H; but when the wheel is used as a driven wheel, motion is communicated through the links H from the outer to the inner rim. The wheel is preferably provided with a wearing tire P, which may be of rubber or any other suitable material.

The side-rings F serve to inclose the space between the inner and the outer rims and thus guard the springs E and prevent the entrance of pebbles or rocks into the space between the rims. The side-rings also tend to keep dust and dirt in large quantities from entering the space between the rims, and they also aid in retaining the wearing tire P in working position.

A construction of the lugs K and L and the links H is shown in detail in Fig. 3.

It is evident that the proportions of the various parts may be made to suit different requirements, the number of links used may be varied as desired, and the form and number of the springs E may be changed as conditions demand, without departing from my invention.

What I claim as new and desire to secure by Letters Patent, is:

1. A resilient wheel comprising an inner rim attached by spokes to a hub and having a plurality of grooves cut axially in its outer surface, an outer rim spaced from said inner rim and having a plurality of grooves cut axially in its inner surface, the grooves in said inner rim being positioned radially opposite the grooves in said outer rim, a plurality of curved free-ended leaf springs positioned in the space between said rims with their free ends in contact with said outer rim, and means for each of said springs for preventing circumferential displacement thereof attached to the middle thereof and having a part adapted to engage loosely in a groove in said outer rim and having a second part adapted to engage loosely in an opposite groove in said inner rim, and means whereby motion is transmitted from one rim to the other.

2. A resilient wheel comprising an inner rim attached by spokes to a hub and having a plurality of grooves cut axially in its outer surface, an outer rim spaced from said inner rim and having a plurality of grooves cut axially in its inner surface, the grooves in said inner rim being positioned radially opposite the grooves in said outer rim, a plurality of curved free ended leaf springs positioned in the space between said rims with their free ends in contact with said outer rim, and means for each of said springs for preventing circumferential displacement thereof attached to the middle thereof and having a part adapted to engage loosely in a groove in said outer rim and having a second part adapted to engage loosely in an opposite groove in said inner rim, and a flat washer for each spring interposed between the convex portion of said spring and the groove in the inner rim.

In witness whereof I have signed my name to this specification.

BYRON L. DEWEY.

Copies of this patent may be obtained for five cents each, by addressing the "Commissioner of Patents, Washington, D. C."